United States Patent
Brenner

[11] Patent Number: 5,718,986
[45] Date of Patent: Feb. 17, 1998

[54] CELLS WITH A BATTERY POSITIVE OF HYPOCHLORITE OR CHLORITE ION AND ANODES OF MAGNESIUM OR ALUMINUM

[76] Inventor: Abner Brenner, 7204 Pomander La., Chevy Chase, Md. 20815

[21] Appl. No.: 715,117

[22] Filed: Sep. 17, 1996

[51] Int. Cl.$^6$ .................................................. H01M 10/36
[52] U.S. Cl. ........................... 429/105; 429/70; 429/199
[58] Field of Search ........................ 429/70, 105, 199

[56] References Cited

U.S. PATENT DOCUMENTS 3,057,760 10/1962 Dereska et al.
4,105,835 8/1978 Gutton et al. ............... 429/199 X
4,234,667 11/1980 Bennion et al. ............. 429/199 X
4,465,743 8/1984 Skarstad et al. ............... 429/105

*Primary Examiner*—Stephen Kalafut
*Attorney, Agent, or Firm*—Lawrence I. Field

[57] ABSTRACT

A cell or battery which is environmentally benign and which has an electrolyte containing a solution of an alkali metal chlorite or hypochlorite, an anode of Mg or Al and an inert cathode.

15 Claims, 3 Drawing Sheets

CELLS WITH A BATTERY POSITIVE OF HYPOCHLORITE OR CHLORITE ION AND ANODES OF MAGNESIUM OR ALUMINUM

This invention relates to a new type of cell or battery in which the electrolyte is a solution containing an alkali metal hypochlorite or an alkali metal chlorite acting as a battery positive or depolarizer.

BACKGROUND OF THE INVENTION

Batteries or cells for generating electricity are known, one of the most common being the-lead acid battery used in motor vehicles. Because the end products include lead or lead components which are toxic a need exists for an environmentally innocuous battery.

The use of polyhalogen depolarizers is described in U.S. Pat. No. 3,057,760 issued Oct. 9, 1962, in which several hundred suitable compounds are listed, most of them being organic compounds, many of which are expensive to prepare.

Another type of known battery is the Leclanche cell in which the battery positive or oxidant, manganese dioxide, has to be mixed with carbon to promote conductivity and which must be kept in a separate compartment so as not to contact the zinc anode.

These and other known batteries each have aspects which make them less than ideal. Accordingly a need exists for a battery or cell which is simple in construction and which does not damage the environment.

One aspect of the invention is to provide a battery or cell which is simple in construction and which uses readily available materials.

Another object of the invention is to provide a battery or cell which does not harm the environment.

Another object of the invention is to provide a battery whose environmental impact is innocuous and whose end products do not pollute or degrade the environment.

These and other objects and advantages of the invent/on will become apparent or will be pointed out in the description which follows, setting forth a preferred embodiment of the invention.

SUMMARY OF THE INVENTION

Briefly stated, the battery or cell of this invention consists of a metallic anode immersed in a solution containing an alkali metal hypochlorite or alkali metal chlorite and an inert cathode for current pickup.

In the cell of this invention the anode is preferably magnesium or aluminum. These are preferred because of their light weight and high electrolytic potential when immersed in a suitable electrolyte.

The inert cathode in the cell of this invention is preferably carbon, platinum or platinized carbon.

The electrolyte in which the anode and cathode are immersed when the battery or cell is being operated is preferably an aqueous solution containing an alkali metal chlorite or hypochlorite as the battery positive or depolarizer. In addition to the alkali metal chlorite or hypochlorite the electrolyte may contain other alkali metal salts hereinafter disclosed.

BRIEF DESCRIPTION OF THE DRAWINGS

As shown in FIG. 1 the battery or cell 10 includes a tank 12 in which an electrolyte 14 is confined. At least one metallic anode 16 and at least one inert cathode 18 is immersed in said electrolyte. A pump 20 is provided to drain tank 12 when the battery is not in operation and a reservoir 24 containing recycled or fresh electrolyte is provided for introducing electrolyte into tank 12 when the battery is to operate.

Figure 1:
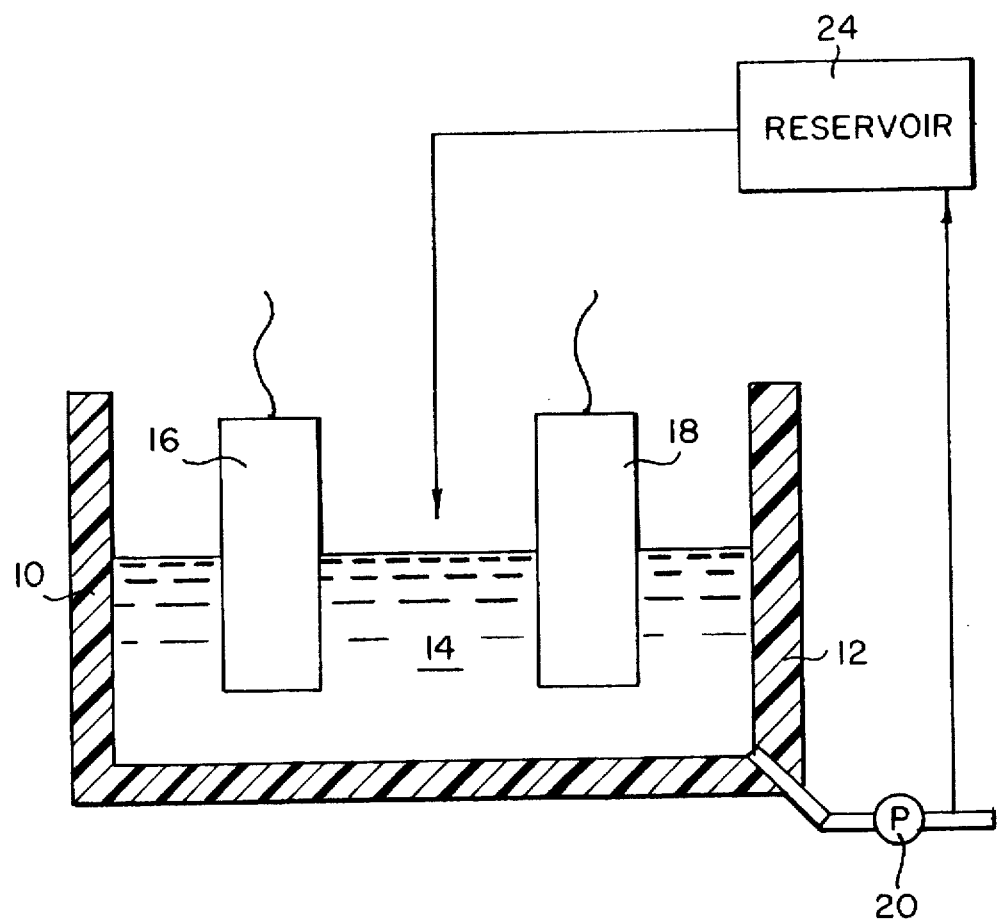
FIG. 1 in the drawings is a schematic view of a battery or cell of the invention.

With regard to the environmental impact of the chlorine oxy-ion batteries of this invention, the products from a spent battery are only sodium chloride, which is ordinary table salt, and a suspension of magnesium or aluminum hydroxide. Thus, with respect to the environment, the battery is innocuous as compared to lead-acid batteries, the disposal of which presents an environmental problem. Also, the reactive materials of the batteries, the anodes and chlorine oxy-ion salts, are products of the electro-chemical industry, which in general, produces less pollution than factories which involves smelting operations.

The main drawback to the general utilization of the chlorine oxy-ion batteries, is that the metal anodes corrode if left immersed in the electrolyte. Therefore, the batteries must be utilized as the reserve type of battery, that is, one in which the electrolyte is admitted into contact with the anode only when the battery is to be put into operation. The electrolyte can be a solution of sodium hypochlorite or a strong solution of sodium chlorite. Since sodium chlorite is a solid, stable salt, it can be incorporated in the dry form in the reserve cell along with the magnesium anode, without reacting with it. The battery could then be activated by simply admitting water to dissolve the sodium chlorite. After activation, these reserve batteries operate for a period of time, dependent on their size.

After being operated to exhaustion, the body or structure of the battery need not be discarded, because being of simple construction the battery could be easily refuelled. The refueling would involve simply flushing out the spent electrolyte and replacing it with a fresh solution and with new anodes. The frequency of replacing anodes may be reduced if an excess weight of the anodes is provided initially. This is feasible, because of the low equivalent weight of magnesium (12.5 g) and of aluminum (9.0 g). An equivalent weight of the metals provides 26.8 Ampere-hours of current. When the battery is on stand-by, it is expedient to pump the electrolyte into a storage tank to prevent corrosion of the anodes.

The reaction for the oxidation of hypochlorite ion is:

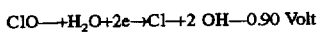

(with respect to the hydrogen electrode)

This voltage is about 0.2 volt more positive than that for manganese dioxide in an alkaline solution and about 0.5 volt more positive than the oxidation potential of oxygen in alkaline solution:

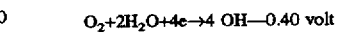

The standard potential of magnesium in aqueous solution is −2.4 volts. Thus, the hypochlorite-magnesium cell should have a theoretical potential of 3.3 volts. For comparison, the standard potential of aluminum is −1.7 volts and of zinc, 0.76 volt.

The calculation for the complete reaction in a cell:

$$Mg+NaClO+H_2O \rightarrow NaCl+Mg(OH)_2,$$

based on free energies gives a value of 3.53 volts. Similarly, the reaction of magnesium with sodium chlorite in solution $$2H_2O+2Mg+NaClO_2 NaCl+2Mg(OH)_2$$

with a theoretical voltage of 3.45 volts.

The experimentally obtained voltage for the magnesium-hypochlorite cell was slightly above 2.0 volts, which was somewhat higher than that of a Leclanche cell (1.5 volts) and about the same as that of a lead-acid cell (2.0 volts):

The salts required for preparing electrolytes are readily available commercially. The sodium hypochlorite is sold as a laundry bleach which contains about 5.2% of sodium hypochlorite and is about 1.5 normal in oxidant. To obtain a more concentrated solution, the bleach can be partially frozen and the remaining liquid poured off. Repetition of this process yielded a solution about 3 normal in oxidant. Although not presently commercially available, the solid sodium hypochlorite, $NaClO.5H_2O$, with a solubility of about 30 grams in 100 grams of saturated solution, would yield a solution about 4.0 normal in oxidant. It has been reported that by passing chlorine into an alkaline solution of sodium hypochlorite a concentration of about 6 normal in oxidant can be obtained.

Sodium chlorite is readily available commercially as a salt containing about 80% of $NaClO_2$. Sodium chlorite is highly soluble. At 30 C, the saturated solution contains 645 grams per liter, which amounts to 46 weight percent of $NaClO_2$, and has a density of 1.41 g/cm$^3$. This solution is about 7 molar, and hence, has an oxidizing power of about 28 equivalents per liter.

As a figure of merit in rating cells, a value commonly used is the watt-hours of energy that could be obtained, theoretically, from a cell weighing one kilogram. In the literature, the weight frequently used in the calculation is the combined weights of the reactive anode and cathode that were utilized to produce the energy. The weight of the electrolyte present in the cell generally was not included in this estimation.

For calculating the specific energy of the cells, which utilized a solution of a chlorine oxy-ion as the battery positive, the weight of the electrolyte in the cell constituted a larger part of the weight of the cell, than did the combined weights of the anode and the salt of the chlorine oxy-ion. To reduce the weight of a cell, therefore, a high concentration of the salt is desirable.

Another commercial source of hypochlorite is calcium hypochlorite, which is sold with an available chlorine content of about 65%. A suspension of this compound in water was not successful as a battery positive because on operation of the cell for a short period of time a tenacious coating of calcium hydroxide was formed on the cathode surface and impeded the flow of current. However, initially the calcium hypochlorite could be converted to an alkali metal hypochlorite by precipitating the calcium, e.g. by treating the suspension with a solution of sodium or potassium carbonate. This resulted in the production of a solution of alkali metal hypochlorite that was more than 3 normal in oxidant. Cesium fluoride also was a successful precipitant for the calcium in calcium hypochlorite to convert it to a usable electrolyte.

The energy density of a cell, consisting of a solution of sodium hypochlorite, as the battery positive, and a magnesium anode, was calculated to be about 97 Whr per kilogram. This value was based on the following conditions: electrolyte, 4.0 normal in oxidant; average voltage during discharge, 1.8 volts, efficiency of utilization of reactants, 60%. A similar calculation was based on a cell with a magnesium anode, immersed in a strong solution of sodium chlorite (4..0 molar; hence, 16 normal in oxidant), and with an average operating voltage of 1.2 volts; and with an efficiency of utilization of reactants of 60%. This cell had an energy density value of 206 Whr/kg.

For comparison, a similar calculation for the lead-acid cell gave a value of 107 Whr/kg. This value was based on the combined weights of the two electrodes, plus that of the weight of the electrolyte, which contained 30% of sulfuric acid. Also, it was assumed that the discharge was a constant 2.0 volts and that the efficiency of utilization of reactants was 100%.

Figure 2:
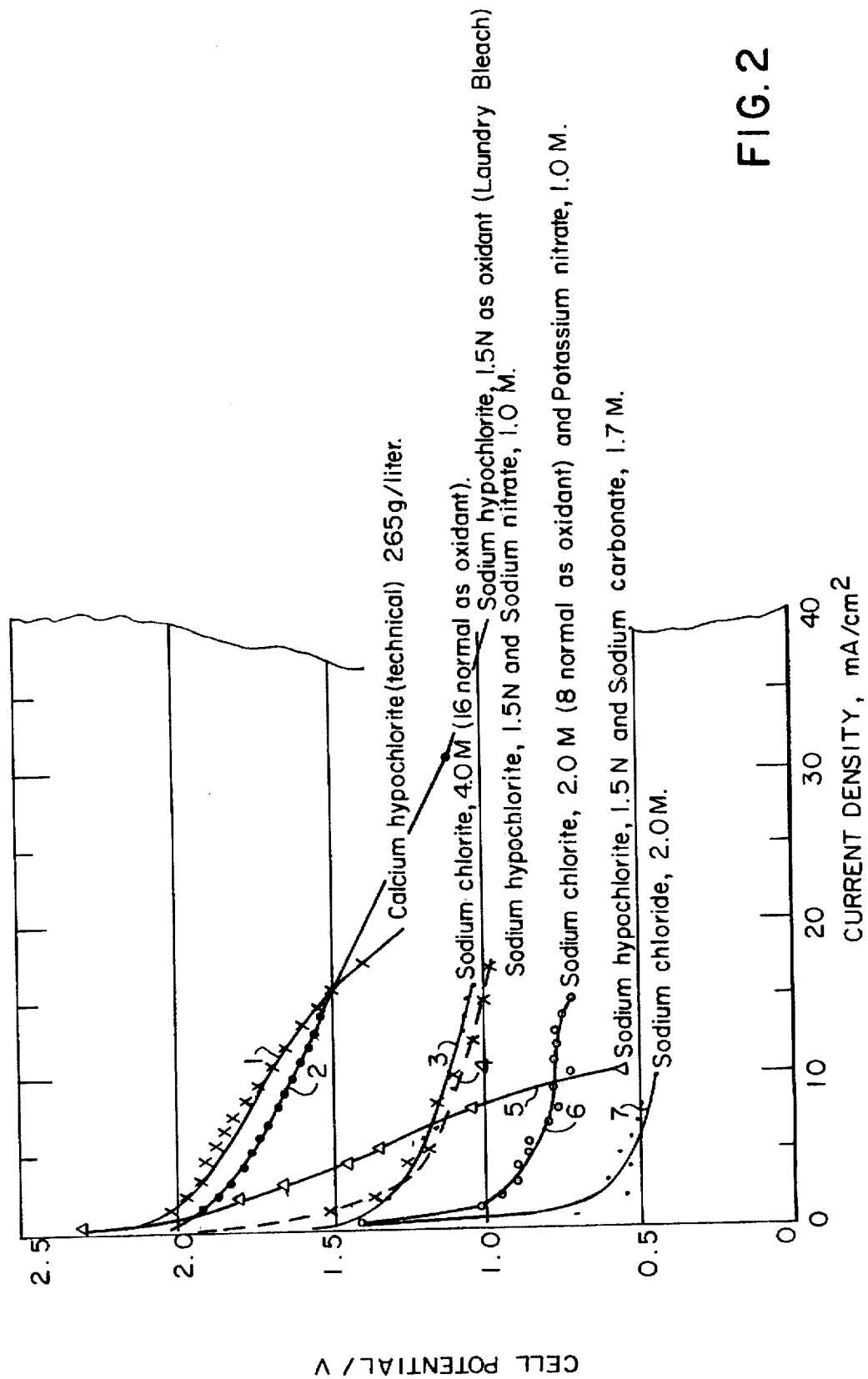
FIGS. 2 and 3 illustrate the operating characteristics of batteries of the invention with Mg and Al anodes, respectively.
Figure 3:
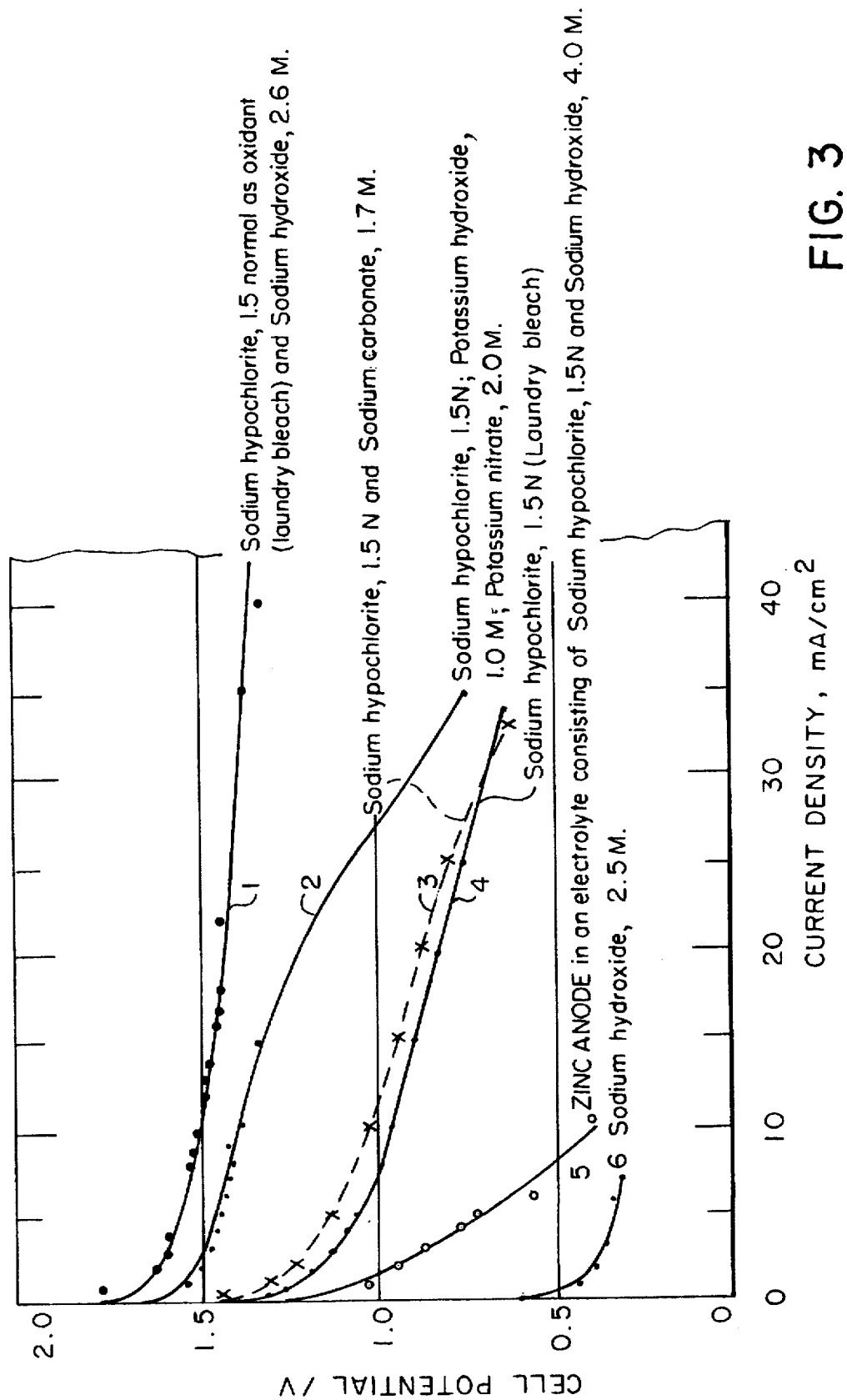

The operating characteristics of the cells are summarized in Tables I and II and in FIGS. 2 and 3.

TABLE I

CORROSION OF MAGNESIUM, ALUMINUM, AND ZINC, RESULTING FROM SIMPLE IMMERSION IN SOLUTIONS OF SODIUM HYPOCHLORITE OR SODIUM CHLORITE, EXPRESSED AS LOSS OF WEIGHT, OR EQUIVALENT LOSS OF AMPERE-HOURS, PER DAY.

| | LOSS OF METAL PER DAY | | | | | |
|---|---|---|---|---|---|---|
| COMPOSITION | WEIGHT LOSS g/dm2 | | | CURRENT LOSS Whr/dm2 | | |
| OF SOLUTION | Mg | Al | Zn | Mg | Al | Zn |
| 1. Sodium Hypochlorite 1.5 N (as Oxidant) | 1.57 | 0.39 | 8.8 | 3.46 | 1.16 | 7.2 |
| 2. Sodium Hypochlorite, 1.5N Sodium Carbonate, 1.7M | 0.27 | 0.063 | — | 0.60 | 0.19 | — |
| 3. Sodium Hypochlorite, 1.5N Sodium Nitrate 1.0M | 0.07 | 0.2 | — | 0.15 | 0.6 | — |
| 4. Sodium Hypochlorite, 1.5N Potassium Chromate, 2,.0M | 0.017 | 0.20 | 0.014 | 0.037 | 0,60 | 0.011 |
| 5. Sodium Chlorite, 4.0M | 0.53 | 0.40 | 0.62 | 1.17 | 1.19 | 0.51 |
| 6. Sodium Chlorite, 2.0M Potassium Nitrate, 1.0M | 0.02 | — | — | 0.044 | — | — |

Table I shows the rate of corrosion of magnesium and aluminum in various solutions. The data of most significance was that the presence of nitrate ion in the hypochlorite solution decreased the corrosion of magnesium significantly. The introduction of even a low concentration of alkali hydroxide into an electrolyte was found to considerably reduce the corrosion of magnesium, but then the magnesium electrode became passive and did not function anodically in the cell. In contrast, hydroxide ion considerably increased the rate of corrosion of aluminum and this reaction could become violent if the solution heated up.

TABLE II

DECREASE IN THE STRENGTH OF HYPOCLORITE SOLUTIONS, AS OXIDANT, AFTER AGING AT ROOM TEMPERATURE (22° C.) IN POLYPROPYLENE BOTTLES.

| | STRENGTH OF SOLUTION (NORMALITY AS OXIDANT) | | |
|---|---|---|---|
| COMPOSITION OF SOLUTION | INITIAL | AFTER 1 MONTH | AFTER 39 MONTHS |
| 1. Sodium Hypochlorite (Concentrated) | 2.91 | 2.73 | 0.88 |
| 2. Sodium Hypochlorite | 1.54 | 1.52 | 0.97 |

TABLE II-continued

DECREASE IN THE STRENGTH OF HYPOCLORITE SOLUTIONS, AS OXIDANT, AFTER AGING AT ROOM TEMPERATURE (22° C.) IN POLYPROPYLENE BOTTLES.

| COMPOSITION OF SOLUTION | STRENGTH OF SOLUTION (NORMALITY AS OXIDANT) | | |
|---|---|---|---|
| | INITIAL | AFTER 1 MONTH | AFTER 39 MONTHS |
| (Laundry Bleach) 3. Sodium Hypochlorite Potassium carbonate, ½M | 1.51 | 1.48 | 0.81 |
| 4. Sodium Hypochlorite Potassium Carbonate, 1.0M | 1.47 | 1.42 | 0.61 |
| 5. Sodium Hypochlorite (Diluted) Potassium Carbonate, ½M | 0.49 | 0.49 | 0.46 |
| 6. Sodium Hypochlorite (Concentrated) Potassium Hydroxide, 3.0M | 2.60 | 2.31 | 0.39 |
| 7. Potassium Hypochlorite | 2.56 | 2.47 | — |

Table II shows the rate of deterioration of solutions of hypochlorite. The decomposition amounted to only a few percent after solutions had aged for a month, and therefore was not significant. However, the loss of oxidizing power was considerable after solutions had aged for three years.

The current density-potential relations for cells with a magnesium anode in various solutions are shown in FIG. 2. Similar data for aluminum anodes are shown in FIG. 3. These observations were made with small cells having a volume of 250 ml and with a spacing of about 2 cm between the anode and a cylindrical platinum cathode. The open circuit voltage of magnesium in sodium hypochlorite was above 2.0 volts and in sodium chlorite solution about 1.7 volts. The addition of any corrosion inhibitor to the electrolytes resulted in a lowering of the available voltage at a given current density. FIG. 3 shows that an aluminum anode in hypochlorite solution yielded an open circuit voltage of about 1.4 volts. The Figure shows, also, that the presence of hydroxide ion in the electrolytes produced an improved hydroxide density-potential relation; but, as noted above, the hydroxide ion could lead to excessive reaction of the electrolyte with the aluminum anode.

REQUIREMENTS FOR THE CONSTRUCTION OF A LARGE OXY-ION CELL

The construction of a large chlorine oxy-ion battery with a magnesium anode would be quite different from that of a conventional battery, such as the lead-acid battery, because the weight of the reactive components and their position in the cell would be quite different. For example, the weight of the magnesium anodes (which have an equivalent weight of 12.15 grams) would be much less than that of lead (which has an equivalent weight of 103.6 grams), hence, the framework for the anodes need be much less rugged. Furthermore, since most of the weight of the chlorine oxy-ion cell was due to the weight of the solution, the container could be a light-weight plastic vessel. The supports for the anodes are constructed to permit the spent anodes to be readily removed and fresh anodes to be installed, without removing the cell from its station.

A chlorine oxy-ion cell with a magnesium anode cannot be recharged, but the system can be refueled. The refuelling of the exhausted cell may be accomplished in a matter of minutes, as compared to the hours required for recharging a secondary battery. The refuelling consists in first flushing out the spent electrolyte. It should be permissible to drain it into a community sewage system, because it is innocuous to the environment, inasmuch as it would consist only of a solution of common table salt and a suspension of magnesium hydroxide. A fresh electrolyte would then be pumped in and fresh anodes added. If the anodes were installed in a larger quantity than that needed to react with the electrolyte, then subsequent refuelling could be performed a few times by simply replacing the electrolyte.

When the cell was not in operation, the magnesium anodes should be preserved from chemical attack by removing the electrolyte. This would be done by a transfer pump which would deliver the electrolyte into a plastic storage vessel.

ADAPTATION OF A MAGNESIUM-CHLORINE OXY-ION BATTERY TO AN EMV

The adaptation of a magnesium-chlorine oxy-ion battery to the propulsion of an electric motor vehicle (EMV) is not likely to be economically feasible as long as there is an abundance of petroleum available. However, if the problem of the contamination of the environment became a serious problem, the battery might warrant some consideration for the EMV, because the battery is environmentally benign. The lead-acid battery, which appears to be the most likely candidate for providing the energy for an EMV, may have some problem with respect to the contamination of the environment with lead, even if the batteries were recycled.

As a base of reference for this possible application of a magnesium-chlorine oxy-ion battery to an EMV, it is assumed that a quantity of electrical energy of about 60 kWhr would be required for propelling a vehicle, weighing 1500 kilograms (which weight would also include the weight of the battery) about 150 kilometers. The minimum weight of a battery that would produce this amount of energy would be about 290 kg for a battery with a magnesium anode and an electrolyte of a 4.0 molar solution of sodium chlorite (specific energy, 206 Whr/kg). This would leave a weight of about 1200 kg for the body of the vehicle and for the framework of the battery. This weight would, also, have to include the weight of the above-mentioned storage reservoir (plastic) and the pump. A vehicle of this weight would be in the category of a small, two to four passenger automobile.

In comparison, a lead-acid battery (specific energy 107 Whr/kg) would weigh a minimum of 560 kg, thus leaving less than 1000 kg for the construction of the vehicle and for the weight of the battery framework.

The magnesium-chlorine oxy-ion battery should consist of an assembly of 15 or 20 cells, connected in the usual way so as to produce at least 20 volts on closed circuit operation. The cathode leads should be thin sheets of carbon or platinized carbon the weight of which would not contribute significantly to the weight of the battery.

One useful property of the magnesium-chlorine oxy-ion cell was its ability to remain somewhat operative, even after the oxidizing power of the electrolyte was exhausted. This would be possible, because the magnesium anode could still function electrochemically in the solution of sodium chloride that would have been formed by the reduction of the hypochlorite or chlorite ion. However, the available power from the battery would be much reduced, as evidenced by the low position of the current density-potential curve 7, in FIG. 3. Another useful property of the battery is an alternative means for relieving the exhaustion of the oxidizing power of the electrolyte. This would be simply the procurement of about 5 gallons of the chlorine type of laundry bleach from a local grocery store. This would provide about 1500 Whr of energy. The possibility of these two assists would be contingent on the presence of an excess weight of magnesium in the initial fuelling.

The chlorine oxy-ion cells are in a favorable position with respect to the availability of the reactive materials used in the cells. The anodes: magnesium and aluminum, and the battery positive (or depolarizers): hypochlorite and chlorite salts, are all products of the electrochemical industry. Thus, the interaction of these materials constitute an indirect method of utilizing electricity as that for the charging of storage batteries. The difference was that the reactants used in the fuel cells were produced in situ and could not be recycled in situ. The availability of the reactants which are used in batteries, may not be a matter of concern at this time, but in the distant future, some of the metals that are used in the commercial storage batteries may cease to be available at an acceptable price. This difficulty could not occur with the materials used in the chlorine oxy-ion cells, because there is an abundance of the precursor elements in the earth's crust: aluminum is the most abundant metal in the crust and magnesium is the eighth most abundant and chlorine constitutes 2% of sea water. In comparison, the abundance of some of the heavy metals in the earth's crust is as follows: zinc, 0.02%; lead, 0.002%; and cadmium, 0.0001%.

PREFERRED EMBODIMENT OF THE CHLORINE OXY-ION TYPE OF CELL

A preferred type of cell is one containing a magnesium anode and an electrolyte consisting of a solution of sodium chlorite, 4 molar or stronger; a cathode lead consisting of carbon, or platinized carbon; and with a potential-current density relation as shown by curve 3 of FIG. 2.

A second choice of cell is one containing a magnesium anode and an electrolyte of sodium hypochlorite, 4 normal or stronger in oxidant and with a potential-current density relation as shown in curve 2 of FIG. 2. A third choice is a cell with an aluminum anode in a strong solution of sodium hypochlorite containing in addition a concentration of sodium hydroxide; a cell with a potential-current density relation as curve 1 in FIG. 3.

Having now described preferred embodiments of my invention in accordance with the United States it is not intended that it be limited except as may be required by the appended claims.

I claim:

1. In a cell or battery comprising a vessel containing an electrolyte, at least one metallic anode and one inert cathode, the improvement which comprises an aqueous solution containing an alkali metal chlorite or hypochlorite as said electrolyte and at least one anode of a metal selected from the group consisting of Mg and Al and alloys based on Mg or Al as said metallic anode.

2. The cell or battery of claim 1 in which the alkali metal is selected from the group consisting of lithium, sodium, potassium, rubidium or cesium.

3. The cell or battery of claim 2 in which the alkali metal is sodium.

4. The cell or battery of claim 1 in which the alkali metal is potassium.

5. The cell or battery of claim 1 in which the anode is Mg.

6. The cell or battery of claim 5 in which the electrolyte is a solution of sodium or potassium hypochlorite.

7. The cell or battery of claim 5 in which the electrolyte is a solution of sodium or potassium chlorite.

8. The cell or battery of claim 1 in which the anode is Al.

9. The cell or battery of claim 8 in which the electrolyte is a solution of sodium or potassium hypochlorite.

10. The cell or battery of claim 8 in which the electrolyte is solution of sodium or potassium chlorite.

11. The cell or battery of claim 8 in which the electrolyte is sodium hypochlorite with added sodium hydroxide.

12. The battery of claim 1 consisting of an assembly of at least two cells and which includes a pump for removing electrolyte from contact with said anodes when the battery is not in service.

13. The battery of claim 12 including a vessel for storing electrolyte for refuelling said cell.

14. A battery consisting of 15 or 20 of the cells of claim 1 of sufficient size to provide 60 kWhr of energy for the purpose of propelling a motor vehicle; and provided with a transfer pump and a reservoir for storage of the electrolyte when the vehicle was not in service.

15. An environmentally benign battery as claimed in claim 1 which produces waste products consisting only of an alkali metal chloride and magnesium or aluminum hydroxide.

* * * * *